United States Patent
Mondello et al.

(10) Patent No.: US 10,872,010 B2
(45) Date of Patent: Dec. 22, 2020

(54) ERROR IDENTIFICATION IN EXECUTED CODE

(71) Applicant: Micron Technology, Inc., Boise, ID (US)

(72) Inventors: Antonino Mondello, Messina (IT); Alberto Troia, Munich (DE)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 16/362,751

(22) Filed: Mar. 25, 2019

(65) Prior Publication Data
US 2020/0310913 A1  Oct. 1, 2020

(51) Int. Cl.
*G06F 11/10* (2006.01)
*B60W 50/02* (2012.01)
*B60W 50/14* (2020.01)

(52) U.S. Cl.
CPC ..... *G06F 11/1008* (2013.01); *B60W 50/0205* (2013.01); *B60W 50/14* (2013.01); *G06F 11/1076* (2013.01)

(58) Field of Classification Search
CPC .................................................... G06F 11/1008
See application file for complete search history.

(56) References Cited

U.S. PATENT DOCUMENTS

| | | | |
|---|---|---|---|
| 4,458,349 A * | 7/1984 | Aichelmann, Jr. | G06F 11/1024 714/6.24 |
| 4,692,893 A * | 9/1987 | Casper | G06F 5/10 710/55 |
| 5,784,548 A * | 7/1998 | Liong | G06F 1/30 714/6.24 |
| 9,235,466 B2 | 1/2016 | Sohn et al. | |
| 2006/0080515 A1* | 4/2006 | Spiers | G06F 11/1441 711/162 |
| 2009/0235114 A1* | 9/2009 | Igashira | G06F 11/1076 714/6.12 |
| 2009/0313498 A1* | 12/2009 | Igashira | G06F 11/1076 714/6.12 |

(Continued)

FOREIGN PATENT DOCUMENTS

KR  10-2014-0005757 A  1/2014

OTHER PUBLICATIONS

U.S. Appl. No. 15/853,498, entitled, "Physical Unclonable Function Using Message Authentication Code", filed Dec. 22, 2017, 28 pages.

(Continued)

*Primary Examiner* — Joseph D Torres
(74) *Attorney, Agent, or Firm* — Brooks, Cameron & Huebsch, PLLC

(57) ABSTRACT

The present disclosure includes apparatuses, methods, and systems for error identification on executed code. An embodiment includes memory and circuitry configured to read data stored in a secure array of the memory, identify a different memory having an error correcting code (ECC) corresponding to the read data of the memory, execute an integrity check to compare the ECC to the read data of the memory; and take an action in response to the comparison of the read data of the memory and the ECC, wherein the comparison indicates that the ECC identified an error in the read data of the memory.

19 Claims, 11 Drawing Sheets

(56) References Cited

U.S. PATENT DOCUMENTS

| | | | |
|---|---|---|---|
| 2011/0191652 A1 | 8/2011 | Dave et al. | |
| 2012/0284587 A1* | 11/2012 | Yu ........................ | G06F 3/0631 |
| | | | 714/773 |
| 2016/0137193 A1 | 5/2016 | Johri et al. | |
| 2016/0246672 A1* | 8/2016 | Yang ..................... | G06F 3/0679 |
| 2018/0121117 A1* | 5/2018 | Berger ................. | G11C 7/1039 |
| 2018/0181464 A1 | 6/2018 | Laity et al. | |
| 2018/0336108 A1 | 11/2018 | Battle et al. | |
| 2020/0117814 A1* | 4/2020 | Ito ....................... | G06F 21/6209 |

OTHER PUBLICATIONS

U.S. Appl. No. 16/201,652, entitled, "Parking Infrastructure Powered by a Decentralized, Distributed Database", filed Nov. 27, 2018, 27 pages.
U.S. Appl. No. 15/993,119, entitled, "Transmission of Vehicle Route Information by Passive Devices", filed May 30, 2018, 25 pages.
U.S. Appl. No. 16/034,763, entitled, "Secure Vehicular Communication", filed Jul. 13, 2018, 37 pages.
U.S. Appl. No. 16/034,809, entitled, "Secure Vehicular Services Communication", filed Jul. 13, 2018, 36 pages.
PCT International Application No. PCT/IB2019/000089, entitled, "Method for Improving Safety of a Component or System Running a Firmware or a Finite State Machine", filed Feb. 22, 2019, 42 pages.
International Search Report and Written Opinion from related International Application No. PCT/US2020/022213, dated Jul. 9, 2020, 14 pages.

* cited by examiner

US 10,872,010 B2

ERROR IDENTIFICATION IN EXECUTED CODE

TECHNICAL FIELD

The present disclosure relates generally to semiconductor memory and methods, and more particularly, to identify error in executed code.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), and magnetic random access memory (MRAM), among others.

Memory devices can be combined together to form a solid state drive (SSD), an embedded MultiMediaCard (e.g., MMC), and/or a universal flash storage (UFS) device. An SSD, e.MMC, and/or UFS device can include non-volatile memory (e.g., NAND flash memory and/or NOR flash memory), and/or can include volatile memory (e.g., DRAM and/or SDRAM), among various other types of non-volatile and volatile memory. Non-volatile memory may be used in a wide range of electronic applications such as personal computers, portable memory sticks, digital cameras, cellular telephones, portable music players such as MP3 players, movie players, among others.

Flash memory devices can include memory cells storing data in a charge storage structure such as a floating gate, for instance. Flash memory devices typically use a one-transistor memory cell that allows for high memory densities, high reliability, and low power consumption. Resistance variable memory devices can include resistive memory cells that can store data based on the resistance state of a storage element (e.g., a resistive memory element having a variable resistance).

Memory cells can be arranged into arrays, and memory cells in an array architecture can be programmed to a target (e.g., desired) state. For instance, electric charge can be placed on or removed from the charge storage structure (e.g., floating gate) of a flash memory cell to program the cell to a particular data state. The stored charge on the charge storage structure of the cell can indicate a threshold voltage (Vt) of the cell. A state of a flash memory cell can be determined by sensing the stored charge on the charge storage structure (e.g., the Vt) of the cell.

Errors introduced into code and threats imposed of stored code can affect the operation of a memory device and/or the data stored in the memory cells of the memory device. Errors may be introduced by noise, and/or during transmission. Threats can include, for example, threats from hackers or other malicious users, including intentional error introduction, man-in-the-middle (MITM) attacks, among others. Such threats can cause significant financial loss, and/or can present significant safety and/or security issues.

DETAILED DESCRIPTION

Figure 1:
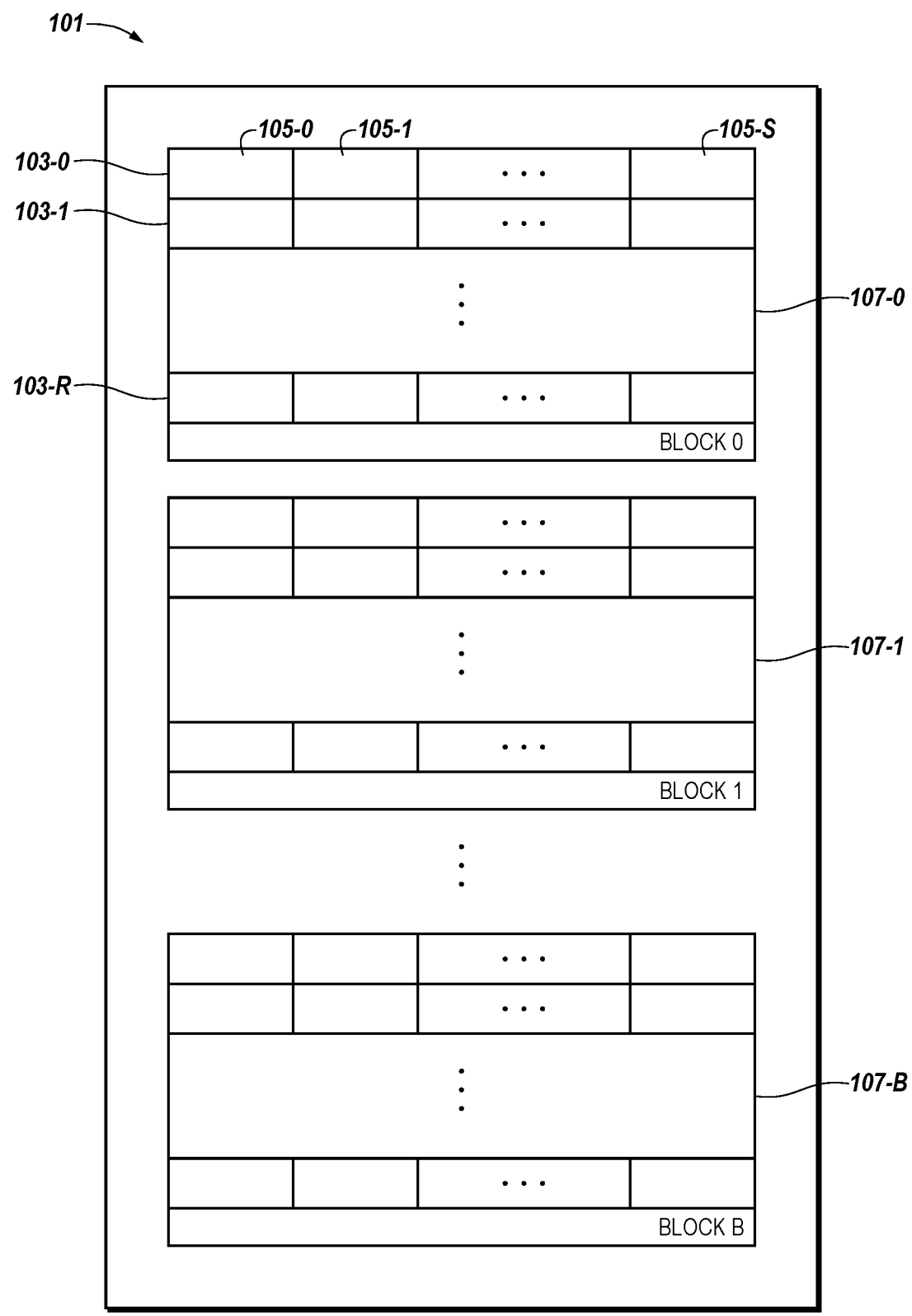
FIG. 1 illustrates a diagram of a portion of a memory array having a number of physical blocks in accordance with an embodiment of the present disclosure.

The present disclosure includes apparatuses, methods, and systems for error identification in executed code. Error correction operations can be performed on a host computing system and/or on a memory device. An embodiment includes a memory, and circuitry configured to identify error in executed code (e.g., read data) by comparing data read by the memory device to error correcting code (ECC) read by a different memory device. Comparing the read data of the memory device and the ECC of the different memory device to determine if an error exists in the read data.

Memory devices may be used to store data in a computing system and can transfer such data between a host associated with the computing system. The data stored in a memory device may be code for routines important to the operation of the of the host. For example, the host device may be a vehicle and the routine may be an operation of the powertrain or the vehicle. Memory devices can be utilized as non-volatile memory for a wide range of electronic applications.

A host can be communicatively coupled to multiple memory devices. In one example, a memory device may include data stored in a secure array of the memory device. The memory device may include circuitry to identify a different memory device having error correcting code (ECC)

which corresponds to the data read by the memory device. The circuitry can be configured to execute an integrity check. An integrity check refers to a comparison of error corrected data to read data. For example, the circuitry can be configured execute an integrity check to compare the ECC to the read data of the memory device and take an action in response to the comparison of the read data and the ECC. When the ECC indicates a correction, the data read by the memory device may include a similar error, and corrective actions may be taken to rectify the error.

Error (e.g., faults) may be introduced into data (e.g., the data stored in the memory cells) stored by a memory device in multiple ways. Error can be unintentionally introduced into code by noise and/or impairments during transmission. In some instances, error can be inadvertently introduced to the data stored in the memory causing changes to the operation of the memory. Error may also be introduced to data stored by memory intentionally through threats. For example, a hacker or other malicious user may introduce error to attempt to perform activities (e.g., attacks), such as, for instance, a man-in-the-middle (MITM) attack, to make unauthorized changes to the operation of the memory, and/or to the data stored therein, for malicious purposes. Another example of a threat and/or a consequence to error introduced to data stored by the memory, is a hacker or other malicious user can attempt to skip a portion of a command (e.g., a portion of executable code) referred herein as a routine, written as a check and/or as a security protocol to authenticate the command.

During such an attack and/or error, the routine is skipped and/or altered, but the host may receive an indication that the routine was executed. Said differently, a hacker and/or an error may falsify the command and cause an indication to be received by the host that the routine was executed. Important routines written to check the authenticity of a command (authenticate a component, authenticate a software version and/or update, user identity, etc.) may be designed to execute during the start-up (e.g., boot) of the memory device. A hacker and/or an introduced error may change (e.g., mask) an external input to trigger conditions which may skip the routine written to validate the authenticity of the command. One example of such routine may be a portion of executable code written to check the authenticity of payment prior to execution of a software service (e.g., issuance of currency from an automatic teller machine and/or transfer of data, execution of software, etc.). Other examples may include routines to validate a software license to authenticate that the software is genuine prior to execution (computer systems updates, installation of software, etc.), important operation routine for the host device (e.g., start-up operations, powertrain operations, etc.), and/or a routine to check the genuineness of a system component and the configuration of the system component (e.g., process plant control, automotive components).

The detection and correction of error can be challenging because the correction of detected error can produce additional (e.g., new) errors. This may cause an unreliability in the resulting architecture of the code (e.g., the routine) and can affect the operation of the memory and the code stored in the memory. Many memory devices employ error checking techniques such as ECC which detect bit errors in data. The ECC can be associated with groups of cells, e.g., memory blocks, memory segments, or memory sectors, and can rescue read failures by detecting and possibly correcting bit errors. Examples, of ECC codes include, Hamming codes, Reed-Solomon (RS) codes, Bose-Chaudhuri-Hochquenghem (BCH) codes, circular redundancy check (CRC) codes, Golay codes, Reed-Muller codes, Goppa codes, and Denniston codes, among others. In some approaches, these and other error checking techniques are performed on the memory device by a controller including circuitry that is coupled to the memory device. As mentioned, the ECC may inadvertently introduce new errors to important routines (e.g., commands), when the errors are identified and corrected.

As such, in order to ensure that errors indicated by ECC are identified but that new errors are not introduced when the identified errors are corrected, an alert may be generated when such errors are detected. A host may be associated with multiple memory devices to detect these errors. For example, a host device may include a host controller which is communicatively coupled to multiple memory devices (e.g., an ECC memory device and a memory device absent ECC). The multiple memory devices may be respectively provisioned with data (e.g., commands and/or routines) and/or ECC corresponding to the data.

In some examples, the ECC and corresponding routines may be securely provisioned onto the memory devices during a manufacturing step and/or securely validated using a public/private key exchanged (further discussed herein). The ECC memory device including the ECC and a memory device including corresponding data (e.g., the routine) may be read in parallel by the respective memory devices. The ECC and the data executed may be compared by the host device and/or a controller associated with the host device. When an error is identified by the ECC running on a memory device having ECC, the data executed by the data memory device can be identified as including a potential error. Said differently, because the data in the memory device corresponds to the ECC in another memory device, an error identified by the ECC indicates an error in the data of the memory device. In this instance, to avoid inadvertent error introduced by implementing an automatic correction, an action can be taken to alert the host and/or the controller that an error in the data of the memory device has been identified. At that time, multiple decisions can be made as to how to correct the error without altering the architecture of important routines.

Embodiments of the present disclosure can utilize cryptographic primitive solutions (e.g., the ECC and or a calculated digest) for error detection in important routines by incorporating a comparison of ECC and data executed in parallel by different memory devices communicatively coupled to the host device. Such solutions can identify error inadvertently and/or intentionally introduced to the code. This can prevent poor operation of important routines written to avoid financial loss, security protocols, and/or provide safety checks for operations of the host device. Further, when an error is identified, the introduction of new errors can be avoided by refraining from an automatic correction. Instead an action (e.g., an alert, alarm, and/or abortion of the routine) can be determined by the host and/or a memory device associated with the host.

As used herein, "a", "an", or "a number of" can refer to one or more of something, and "a plurality of" can refer to two or more such things. For example, a memory device can refer to one or more memory devices, and a plurality of memory devices can refer to two or more memory devices. Additionally, the designators "M", "P", "R", "B", "S", and "N", as used herein, particularly with respect to reference numerals in the drawings, indicates that a number of the particular feature so designated can be included with a number of embodiments of the present disclosure. The number may be the same or different between designations.

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 201 in FIG. 2.

FIG. 1 illustrates a diagram of a portion of a memory array 101 having a number of physical blocks in accordance with an embodiment of the present disclosure. Memory array 101 can be, for example, a flash memory array such as a NAND flash memory array. As an additional example, memory array 101 can be a resistance variable memory array such as a PCRAM, RRAM, MMRAM, or spin torque transfer (STT) array, among others. However, embodiments of the present disclosure are not limited to a particular type of memory array. Further, memory array 101 (e.g., a subset of array 101, or the whole array 201) can be a secure memory array, as will be further described herein. Further, although not shown in FIG. 1, memory array 101 can be located on a particular semiconductor die along with various peripheral circuitry associated with the operation thereof.

As shown in FIG. 1, memory array 101 has a number of physical blocks 107-0 (BLOCK 0), 107-1 (BLOCK 1), ..., 107-B (BLOCK B) of memory cells. The memory cells can be single level cells and/or multilevel cells such as, for instance, two level cells, triple level cells (TLCs) or quadruple level cells (QLCs). As an example, the number of physical blocks in memory array 101 may be 128 blocks, 512 blocks, or 1,024 blocks, but embodiments are not limited to a particular power of two or to any particular number of physical blocks in memory array 101.

A number of physical blocks of memory cells (e.g., blocks 107-0, 107-1, ..., 107-B) can be included in a plane of memory cells, and a number of planes of memory cells can be included on a die. For instance, in the example shown in FIG. 1, each physical block 107-0, 107-1, ..., 107-B can be part of a single die. That is, the portion of memory array 101 illustrated in FIG. 1 can be a die of memory cells.

As shown in FIG. 1, each physical block 107-0, 107-1, ..., 107-B includes a number of physical rows (e.g., 103-0, 103-1, ..., 103-R) of memory cells coupled to access lines (e.g., word lines). The number of rows (e.g., word lines) in each physical block can be 32, but embodiments are not limited to a particular number of rows 103-0, 103-1, ..., 103-R per physical block. Further, although not shown in FIG. 1, the memory cells can be coupled to columns of sense lines (e.g., data lines and/or digit lines).

As one of ordinary skill in the art will appreciate, each row 103-0, 103-1, ..., 103-R can include a number of pages of memory cells (e.g., physical pages). A physical page refers to a unit of programming and/or sensing (e.g., a number of memory cells that are programmed and/or sensed together as a functional group). In the embodiment shown in FIG. 1, each row 103-0, 103-1, ..., 103-R comprises one physical page of memory cells. However, embodiments of the present disclosure are not so limited. For instance, in an embodiment, each row can comprise multiple physical pages of memory cells (e.g., one or more even pages of memory cells coupled to even-numbered data lines, and one or more odd pages of memory cells coupled to odd numbered data lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

As shown in FIG. 1, a page of memory cells can comprise a number of physical sectors 105-0, 105-1, ..., 105-S (e.g., subsets of memory cells). Each physical sector 105-0, 105-1, ..., 105-S of cells can store a number of logical sectors of data. Additionally, each logical sector of data can correspond to a portion of a particular page of data. As an example, a first logical sector of data stored in a particular physical sector can correspond to a logical sector corresponding to a first page of data, and a second logical sector of data stored in the particular physical sector can correspond to a second page of data. Each physical sector 105-0, 105-1, ..., 105-S, can store system and/or user data, and/or can include overhead data, such as error correction code (ECC) data, logical block address (LBA) data, and metadata.

Logical block addressing is a scheme that can be used by a host for identifying a logical sector of data. For example, each logical sector can correspond to a unique logical block address (LBA). Additionally, an LBA may also correspond (e.g., dynamically map) to a physical address, such as a physical block address (PBA), that may indicate the physical location of that logical sector of data in the memory. A logical sector of data can be a number of bytes of data (e.g., 256 bytes, 512 bytes, 1,024 bytes, or 4,096 bytes). However, embodiments are not limited to these examples.

It is noted that other configurations for the physical blocks 107-0, 107-1, ..., 107-B, rows 103-0, 103-1, ..., 103-R, sectors 105-0, 105-1, ..., 105-S, and pages are possible. For example, rows 103-0, 103-1, ..., 103-R of physical blocks 107-0, 107-1, ..., 107-B can each store data corresponding to a single logical sector which can include, for example, more or less than 512 bytes of data.

Figure 2A:
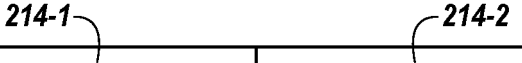
FIG. 2A illustrates an example of a pair of registers used to define a secure memory array in accordance with an embodiment of the present disclosure.
Figure 2B:
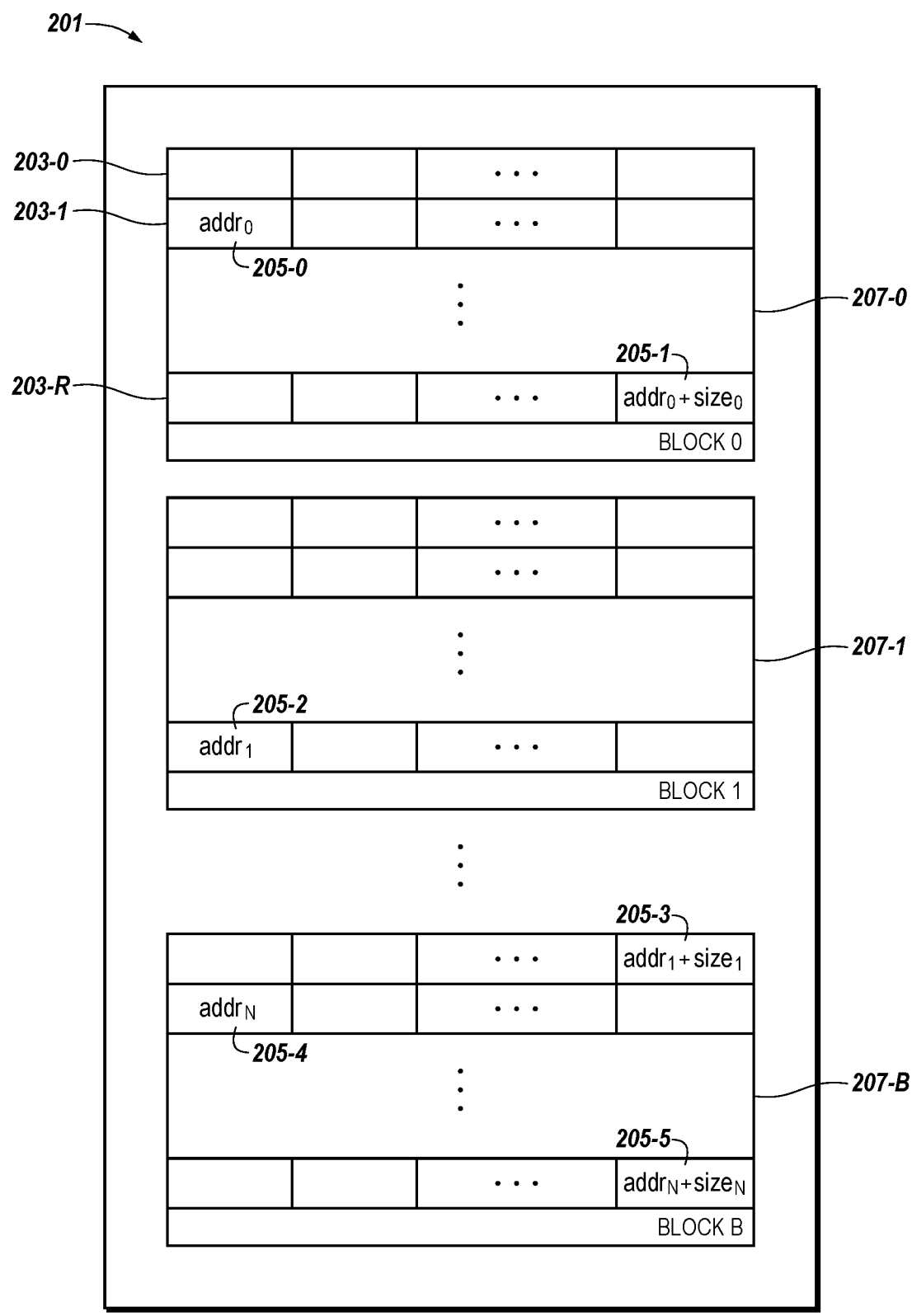
FIG. 2B illustrates a diagram of a portion of a memory array that includes a secure memory array defined in accordance with an embodiment of the present disclosure.

FIG. 2A illustrates an example of a pair of registers 214-1 and 214-2 used to define a secure memory array in accordance with an embodiment of the present disclosure, and FIG. 2B illustrates a diagram of a portion of a memory array 201 that includes a secure memory array defined using registers 214-1 and 214-2 in accordance with an embodiment of the present disclosure. Although embodiments are not so limited, and one or more registers and/or one or more pairs of registers could be used. As shown in FIG. 2B, secure memory array 201 can include a number of physical blocks 207-0, 207-1, ..., 207-B of memory cells, each including a number of physical rows 203-0, 203-1, ..., 203-R having a number of sectors of memory cells, in a manner analogous to memory array 101 described in connection with FIG. 1.

As shown in FIG. 2A, register 214-1 can define addresses of the secure array (e.g., the addresses of different portions of the secure array), and register 214-2 can define sizes of the secure array (e.g., the sizes of the different portions of the secure array). The addresses of the secure array defined by register 214-1 can correspond to, for instance, starting points (e.g., starting LBAs) of the secure array (e.g., the starting points of the different portions of the secure array), and the sizes of the secure array defined by register 214-2 can correspond to, for instance, ending points (e.g., ending LBAs) of the secure array (e.g., the ending points of the different portions of the secure array).

For example, as shown in FIG. 2A, registers 214-1 and 214-2 can define N pairs of values, with each respective pair comprising an address value (e.g., addr) defined by register 214-1 and a size value (e.g., size) defined by register 214-2. For instance, in the example illustrated in FIG. 2A, Pair$_0$ comprises address value addr$_0$ and size value size$_0$ (e.g., Pair$_0$=[addr$_0$, size$_0$]), Pair$_1$ comprises address value addr$_1$ and size value $size_1$ (e.g., $Pair_1=[addr_1, size_1]$), and so on, with $Pair_N$ comprising address value $addr_N$ and size value $size_N$ (e.g., $Pair_N=[addr_N, sizer]$). The address value of a pair can correspond to a starting point (e.g., starting LBA) of a portion of the secure array, and the sum of the address value and the size value of that pair can correspond to the ending point (e.g., ending LBA) of that portion of the secure array. As such, the entire secure array (e.g., the portions that comprise the entire secure array) can be given by: $[addr_0, addr_0+size_0] \cup [addr_1, addr_1+size_1] \cup \ldots \cup [addr_N, addr_N+size_N]$.

The first pair whose size value defined by register 214-2 is zero can stop the definition of the secure array. For instance, in the example illustrated in FIG. 2A, if the size value of $Pair_2$ is zero, then the secure array would be given by: $[addr_0, addr_0+size_0] \cup [addr_1, addr_1+size_1]$.

An example of a secure array defined by registers 214-1 and 214-2 (e.g., with all size values defined by register 214-2 as non-zero) is illustrated in FIG. 2B. For instance, as shown in FIG. 2B, the address (e.g., LBA) associated with sector 205-0 of memory array 201 is $addr_0$, the address associated with sector 205-1 of memory array 201 is $addr_0+size_0$, the address associated with sector 205-2 of memory array 201 is $addr_1$, the address associated with sector 205-3 of memory array 201 is $addr_1+size_1$, the address associated with sector 205-4 of memory array 201 is $addr_N$, and the address associated with sector 205-5 of memory array 201 is $addr_N+size_N$. As such, the secure array comprises sectors (e.g., the data stored in sectors) 205-0 through 205-1, sectors 205-2 through 205-3, and 205-4 through 205-5. However, the sectors of memory array 201 that are before sector 205-0, and sectors 205-1 through 205-2 of memory array 201, are not part of the secure array (e.g., the secure array comprises a subset of array 201).

Figure 3:
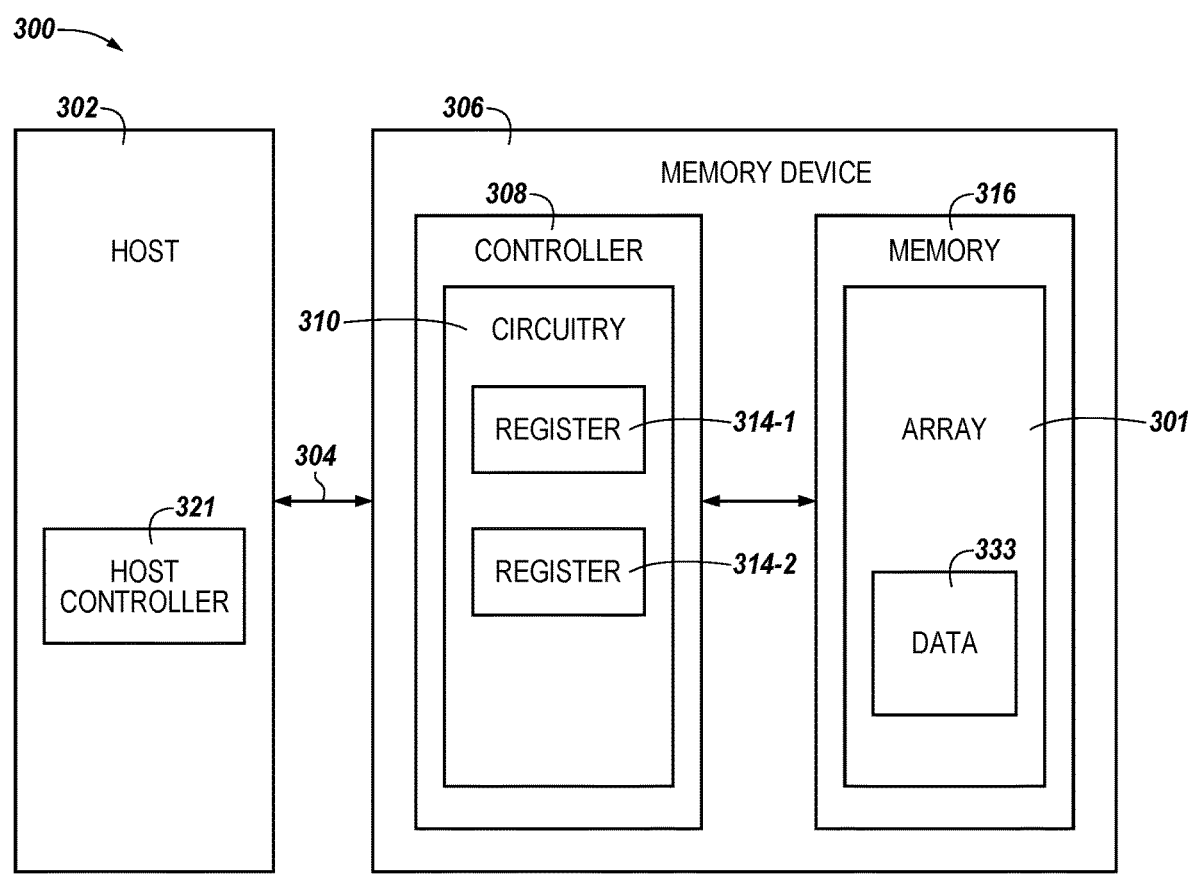
FIG. 3 is a block diagram of a computing system including a host and an apparatus in the form of a memory device in accordance with an embodiment of the present disclosure.

FIG. 3 is a block diagram of a computing system 300 including a host 302 and an apparatus in the form of a memory device 306 in accordance with an embodiment of the present disclosure. As used herein, an "apparatus" can refer to, but is not limited to, any of a variety of structures or combinations of structures, such as a circuit or circuitry, a die or dice, a module or modules, a device or devices, or a system or systems, for example. Further, in an embodiment, computing system 300 can include a number of memory devices analogous to memory device 306.

In the embodiment illustrated in FIG. 3, memory device 306 can include a memory 316 having a memory array 301. Memory array 301 can be analogous to memory array 101 described in connection with FIG. 1 and memory array 201 described in connection with FIG. 2B. Further, in an embodiment, memory array 301 (e.g., a subset of array 301, or the whole array 301) can be a secure array (e.g., an area of memory 316 to be kept under control).

FIG. 3 illustrates a pair of registers 314-1 and 314-2 although embodiments are not so limited, and one or more registers and/or one or more pairs of registers could be used. Registers 314-1 and 314-2 can be, for instance, registers 214-1 and 214-2, described in connection with FIG. 2A, and secure memory array 301 can be, for instance, memory array 201 described in connection with FIG. 2B. Data (e.g., the data 333) stored in memory array 301 can include sensitive (e.g., non-user) data, such as device firmware and/or code to be executed for sensitive applications (e.g., the routine). In some examples, the memory device 306 can include ECC corresponding to data 333 where the ECC, and/or a digest of data calculated by the memory device 306 are stored by the memory 316 in the same manner as the data 333 illustrated by FIG. 3 (this embodiment is discussed in connection with FIG. 4).

In such embodiments, the pair of non-volatile registers 314-1, and 314-2 can be used to define the secure array to store the data 333 (and/or the ECC, corresponding data, and/or a digest). For example, in the embodiment illustrated in FIG. 3, circuitry 310 includes registers 314-1 and 314-2 that can be used to define the secure array. For instance, register 314-1 can define the address (e.g., the starting LBA of the data) of the secure array, and register 314-2 can define the size (e.g., the ending LBA of the data) of the secure array. Using this method, the data 333 can be stored and protected by the memory device 306.

As illustrated in FIG. 3, host 302 can be coupled to the memory device 306 via interface 304. Host 302 and memory device 306 can communicate (e.g., send commands and/or data) on interface 304. Host 302 and/or memory device 306 can be, or be part of, a computing device, a laptop computer, personal computer, digital camera, digital recording and playback device, mobile telephone, PDA, memory card reader, interface hub, or Internet of Things (IoT) enabled device, such as, for instance, an automotive (e.g., vehicular and/or transportation infrastructure) IoT enabled device or a medical (e.g., implantable and/or health monitoring) IoT enabled device, an automatic teller machine (ATM), among other host systems, and can include a memory access device (e.g., a processor). One of ordinary skill in the art will appreciate that "a processor" can intend one or more processors, such as a parallel processing system, a number of coprocessors, etc.

Interface 304 can be in the form of a standardized physical interface. For example, when memory device 306 is used for information storage in computing system 300, interface 304 can be a serial advanced technology attachment (SATA) physical interface, a peripheral component interconnect express (PCIe) physical interface, a universal serial bus (USB) physical interface, or a small computer system interface (SCSI), among other physical connectors and/or interfaces. In general, however, interface 304 can provide an interface for passing control, address, information (e.g., data), and other signals between memory device 306 and a host (e.g., host 302) having compatible receptors for interface 304.

Memory device 306 includes controller 308 to communicate with host 302 and with memory 316 (e.g., memory array 301). For instance, controller 308 can send commands to perform operations on memory array 301, including operations to sense (e.g., read), program (e.g., write), move, and/or erase data, among other operations.

Controller 308 can be included on the same physical device (e.g., the same die) as memory 316. Alternatively, controller 308 can be included on a separate physical device that is communicatively coupled to the physical device that includes memory 316. In an embodiment, components of controller 308 can be spread across multiple physical devices (e.g., some components on the same die as the memory, and some components on a different die, module, or board) as a distributed controller.

Host 302 can include a host controller 321 to communicate with memory device 306. The host controller 321 can be included on the same physical host device 302. Alternatively, the host controller 321 can be a separate physical device that is communicatively coupled to the memory device 306 and or multiple memory devices (discussed further in connection with FIG. 4). The host controller 321 can send commands to memory device 306 via interface 304. The host controller 321 can communicate with memory device 306 and/or the controller 308 on the memory device 306 to read, write, and/or erase data, among other operations. Further, in an embodiment, host 302 can be an IoT enabled device, as described herein, having IoT communication capabilities.

Controller 308 on memory device 306 and/or the host controller 321 on host 302 can include control circuitry and/or logic (e.g., hardware and firmware). In an embodiment, controller 308 on memory device 306 and/or the host controller 321 can be an application specific integrated circuit (ASIC) coupled to a printed circuit board including a physical interface. Also, memory device 306, host controller 321 and/or host 302 can include a buffer of volatile and/or non-volatile memory and a number of registers (e.g., the registers 314-1 and 314-2).

For example, as shown in FIG. 3, memory device 306 can include circuitry 310. In the embodiment illustrated in FIG. 3, circuitry 310 is included in controller 308. However, embodiments of the present disclosure are not so limited. For instance, in an embodiment, circuitry 310 may be included in (e.g., on the same die as) memory 316 (e.g., instead of in controller 308). Circuitry 310 can comprise, for instance, hardware, firmware, and/or software.

Computing system 300 (e.g., host 302 and memory device 306) can utilize error identification in executed code to determine if an error has been identified in data 333. For example, the circuitry 310 may read data 333 stored in the array 301 of the memory 316. The circuitry 310 can identify a different memory which can include an ECC corresponding to the data 333 read by the circuitry 310. As mentioned, the automatic correction of error introduced to the data 333 may introduce additional error. The memory device 306 may execute an integrity check to compare the ECC to the data 333 read by the memory device 306. The memory device 306 may take an action in response to the comparison of the read data of the memory 316 and the ECC, where the comparison indicates that the ECC identified an error in the data 333 read by the memory 316. In this way, the memory device 306, the host controller 321, and/or the host 302 can make a determination of how to correct the error identified by the ECC.

For example, the circuitry 310 can be configured to determine whether the error identified by the ECC affects an operation of the host device 302 associated with the data 333 read by the memory 316. For example, the data 333 can be code for a routine relating to a powertrain operation for a host 302 in the form of a vehicle. The powertrain routine can be provisioned to the memory 316 as data 333 and to a different memory as ECC during manufacture and/or another secure instance. The memory device 306 may be a boot memory device that executes the powertrain routine (e.g., the data 333).

The host controller 321, the circuitry 310 and/or the memory 316 can execute an integrity check in response to a start-up process of the memory 316 and/or other indication to execute the data 333. The integrity check can include a comparison by the host controller 321, the circuitry 310 and/or the memory 316, of ECC read by a different memory included on a different memory device in parallel to the data 333 read by the memory 316. The integrity check can include a determination by the circuitry 310 and/or the host 302 that a correction applied to an error identified by the ECC introduced an additional error to the ECC. Said differently, the automatic correction of identified error by the ECC may have introduced new error to the ECC and applying a similar correction to the data 333 may introduce additional error the data 333. Introduction of other error may cause the routine to be skipped, altered, and/or other operational problems. Based on the integrity check, the host 302, host controller 321, and/or the circuitry 310 can be take an action to refrain from correcting the error corresponding to the read data 333 of the memory in response to the error identified by the ECC, and/or may determine an alternative method of correction.

Figure 4:
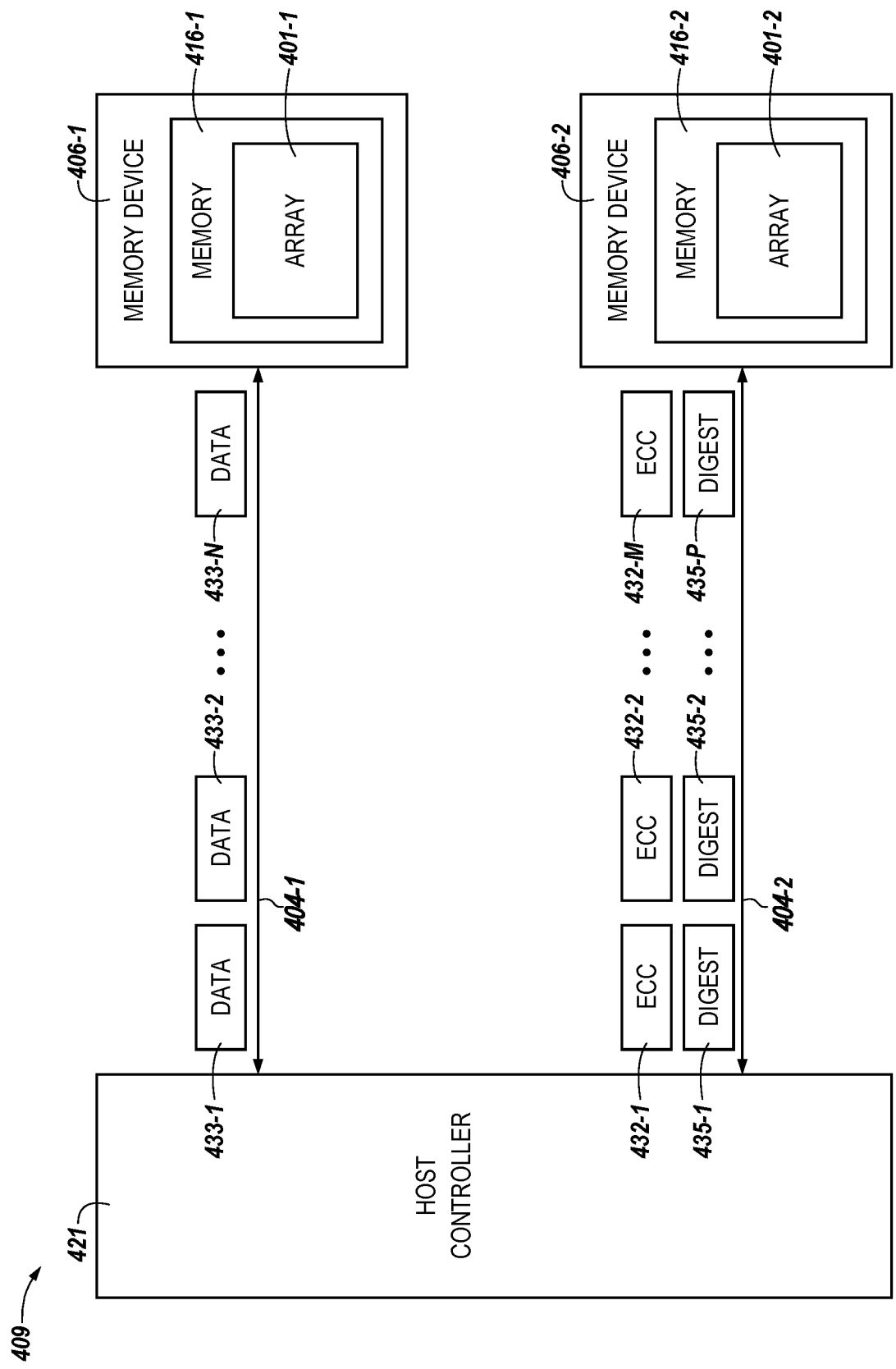
FIG. 4 illustrates example block diagram of an example system including a host controller and an apparatus in accordance with an embodiment of the present disclosure.

FIG. 4 illustrates a block diagram of an example system 409 including a host controller 421 and example memory devices 406-1 and 406-2 in accordance with an embodiment of the present disclosure. A host (e.g., the host 302 of FIG. 3) may include a host controller 421, where the host controller 421 can be communicatively coupled to at least one memory device (e.g., memory device 406-1) and at least one other memory device (e.g., the memory device 406-2). For example, the system 409 illustrated in FIG. 4 includes a host controller 421 communicatively coupled via interface 404-1 to a memory device 406-1 having a memory 416-1 and an array 401-1. The host controller 421 is illustrated as communicatively coupled via interface 404-2 to another memory device 406-2 having a memory 416-2 and an array 401-2.

The memory device 406-1 can be provisioned with data 433-1, 433-2, and 433-N (e.g., data 333 of FIG. 3). The data 433-1, 433-2, and 433-N can be a code stream corresponding to a routine. The data 433-1, 433-2, and 433-N coding for the routine may be securely provisioned onto the memory device 406-1 using a public/private key exchange between the host associated with the host controller 421 and the memory device 406-1. The ECC 432-1, 432-2, and 432-M may correspond to the data 433-1, 433-2, and 433-N and be securely provisioned onto the memory device 406-2 using a public/private key exchange between the host associated with the host controller 421 and the memory device 406-1. The generation and validation of the public and private keys are discussed further in connection with FIGS. 6-11.

In some examples, the data 433-1, 433-2, and 433-N making up the code stream for the routine can be fixed units of data (e.g., 5-8 double words, but examples are not so limited). The routine can be run-time executable code which may be important to the operation of the host corresponding to the host controller 421. To detect error in the data 433-1, 433-2, 433-N and determine an action to correct the error, the host controller 421 can be associated with a different memory device 406-2, where the different memory device 406-2 is provisioned with the routine (e.g., a code stream for the routine coded in data 433-1, 433-2, and 433-N) and error correction/detection capabilities.

For example, the memory device 406-2 can include ECC 432-1, 432-2, 432-M corresponding to the routine, and/or digest 435-1, 435-2, 435-P corresponding to the routine. The ECC 432-1, 432-2, 432-M may include code corresponding to data 433-1, 433-2, and 433-N of the memory device 406-1 where the ECC is a bit parity concatenated therewith. For example, ECC 432-1 may include the code of data 433-1 concatenated with an error correcting portion, ECC 432-2 may include the code of data 433-2 concatenated with an error correcting portion, and ECC 432-M may include the code of data 433-N concatenated with an error correcting portion.

The digests 435-1, 435-2, and 435-P are products of a hash function applied by the circuitry (e.g., the circuitry 310 of FIG. 3) to the code (e.g., the data 433-1, 433-2, 433-N) for the routine. For example, the digest 435-1, 435-2, and 435-P can be cryptographic primitives (e.g., a hash) produced from corresponding data (e.g., the data 433-1, 433-2, 433-N), where a change to the data can produce a different digest. Said differently, a digest calculated by the circuitry of data 433-1 will be change when an error is present in the data 433-1.

For example, the digest 435-1 can be a hash for the data 433-1, the digest 435-2 can be a hash for the data 433-2, and the digest 435-P can be a hash for the data 433-N. Used individually or together, the ECC (432-1, 432-2, 432-M) and the digests (435-1, 435-2, 435-P) can be used by the host (e.g., the host 302 of FIG. 3), the host controller 421, and/or circuitry (e.g., the circuitry 310 of FIG. 3) to determine the integrity of the code of the routine (e.g., the data 433-1, 433-2, and 433-N) as it is executed by the memory device 406-1.

The data 433-1, 433-2, 433-N may be executed in parallel with the ECC 432-1, 432-2, 432-M and/or the digest 435-1, 435-2, 435-P to identify error in the executed code (e.g., the data 433-1, 433-2, 433-N). Specifically, the memory device 406-2 can include circuitry (e.g., the circuitry 310 of FIG. 3) configured to read ECC (e.g., 432-1, 432-2, and 432-M) stored in an array 401-2 of the memory 416-2, and identify a different memory device 406-1 having read data 433-1, 433-2, 433-N corresponding to the ECC e.g., 432-1, 432-2, and 432-M of the memory 416-2. The circuitry of the memory device 406-2, and/or the host controller 421 can execute an integrity check to compare the ECC e.g., 432-1, 432-2, and 432-M to the read data 433-1, 433-2, and 433-N of the different memory device 406-1. The integrity check can determine and/or monitor the read data 433-1, 433-2, and 433-N for error, based on the comparison to the ECC 432-1, 432-2, and 432-M.

In response to the comparison of the read data 433-1, 433-2, 433-N and the ECC 432-1, 432-2, and 432-M, the host controller 421 and/or the circuitry can take an action, where the comparison indicates that the ECC identified an error in the read data 433-1, 433-2, and/or 433-N of the memory device 406-1. Because the correction of error can introduce new error into the data to be executed, the host controller 421 and/or the circuitry associated with the memory device 406-1 may take an action to refrain from correcting the error identified by the ECC 432-1, 432-2, and 432-M. Alternatively and/or additionally, the host controller 421 and/or the circuitry associated with the memory device 406-1 can determine how the error and/or the correction of the error may affect the routine coded by the data 433-1, 433-2, and 433-N and determine to correct the error identified by the comparison of the ECC 432-1, 432-2, and 432-M and the data 433-1, 433-2, 433-N. In this way, inadvertent error introduced by a corrective action can be monitored and/or identified.

Figure 5:
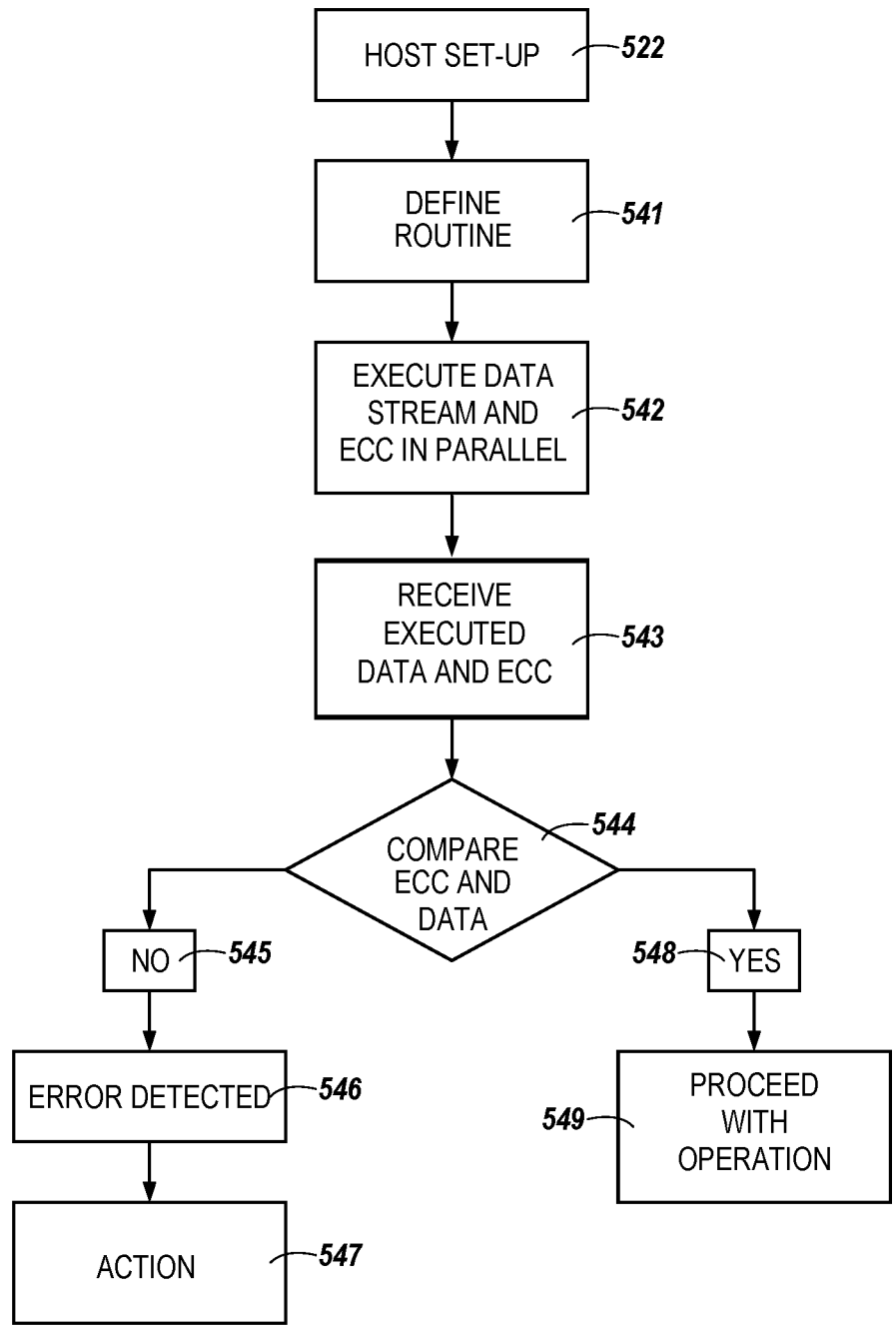
FIG. 5 illustrates an example flow diagram for error identification in executed code in accordance with embodiments of the present disclosure.

FIG. 5 illustrates an example flow diagram for error identification in executed code in accordance with embodiments of the present disclosure. At 522, a host device (e.g., the host 302 of FIG. 3) can set-up at least one memory device to execute a routine for an operation of the host device. For example, at 541, the host device can define a routine. The host device may securely communicate with one or more memory devices (e.g., the memory devices 406-1 and 406-2 of FIG. 4) by exchanging public/private keys to exchange encrypted data (e.g., the data 433-1, 433-2, 433-N) to code for the routine. The host device and/or circuitry (e.g., the circuitry 310 of FIG. 3) associated with the memory devices can provision at least one memory device with ECC (e.g., the ECC 432-1, 432-2, 432-M) and/or may calculate a digest (e.g., 435-1, 435-2, and 435-P of FIG. 4) based on the ECC and/or data.

As mentioned, the host device may be a vehicle and the host controller may be included in the vehicle or external to the vehicle. The host controller may be in communication with multiple memory devices, the memory devices may store data strings that code for important routines (e.g., powertrain operation) of the vehicle (e.g., the host device). The memory devices may be provisioned with the data and corresponding ECC and/or the digests may be calculated at a secure location and/or a secure time. For example, the memory devices may be provisioned with the data, ECC, and digest during the manufacture of the host and/or host controller.

The host device may include a host controller (e.g., the host controller 421 of FIG. 4) communicatively coupled to the memory devices to identify error in executed code. At 542, the host controller, and/or the circuitry of the respective memory devices can execute the data stream and corresponding ECC in parallel. For example, a first memory device may be a boot memory device having memory and circuitry and in communication with the host controller. A second memory device may be an error correcting memory device having memory and circuitry, and also in communication with the host controller. A system (e.g., the system 409 of FIG. 4) may start-up and the first memory device may read the data stream of the routine in parallel with the second memory device reading the ECC corresponding to the routine. The first memory device, via circuitry (e.g., the circuitry 310 of FIG. 3), may transmit the read data to the host controller. The second memory device, via circuitry (e.g., the circuitry 310 of FIG. 3), may transmit the read ECC to the host controller.

At 543, the host controller may receive the executed (e.g., read) data transmitted from circuitry of the first memory device and the ECC corresponding to the data from the circuitry of the second memory device. In some examples, the circuitry of the second memory device may be configured to transmit a calculated digest (e.g., a calculated hash) corresponding to the data stream transmitted by the first memory device. The digest may be transmitted by the circuitry of the second memory device individually or together with the ECC data such that the host device may execute an integrity check.

For example, at 544, the host controller may execute an integrity check by comparing the received ECC and/or the digest corresponding to the data (and calculated by the circuitry of the second memory device) to the read data from the first memory device. If the ECC of the second memory device and the read data of the first memory device do not match ("NO" at 545), there may be an error in the read data. Put another way, the ECC may automatically correct one or more errors thereby no longer corresponding to the data of the first memory device. In this example, at 547, the host controller and/or the circuitry associated with the first memory device may take an action in response to the comparison that the ECC identified an error in the read data of the first memory device.

In some examples, comparing the read data of the first memory device to the ECC provided by the second memory device includes comparing a hash function corresponding to the data and a digest corresponding to the ECC. The digest calculated may not match the expected read data (e.g., or a hash of the expected read data) of the first memory device. Each digest (e.g., 435-1, 435-2, 435-P of FIG. 4) may be calculated based on the data (e.g., 433-1, 433-2, 433-N of FIG. 4), where any change to the data may change the value of the digest. When an error has occurred in the data, the digest outputted by the second memory device may change indicating an error. The host controller and/or the circuitry of the first memory device may compare, at 544, the received digest to the read data. If the digest and the read data do not match, (e.g., "NO" at 546) an error has occurred and the host controller and/or the circuitry of the memory devices may take an action at 547.

For example, the circuitry of the first and/or second memory device can determine where the error occurred in the routine and determine what effect the error may have on the routine. The circuitry of the first and/or second memory device can abort (e.g., halt) the operation of the host device based on the identification of the error by the ECC and/or the digest. Alternatively, and/or additionally, the host controller may correct the error in the read data based on the identification by the ECC and/or the digest. In another example, the action taken may be an alert indicating the error, where the alert is created by the circuitry of the first memory device and/or the second memory device and communicated to the host device.

During the during the integrity check comparison at 544, the host controller, and/or the circuitry of the first memory device and/or the second memory device may determine that the received read data from the first memory device and the ECC and/or the digest of the second memory device match ("YES" at 548). The matching read data to the ECC and/or the digest indicates that there is no error present in the read data from the first memory device. In this example, at 549, the circuitry of the first and/or the second memory device may proceed with the operation of the routine coded by the data.

Figure 6:
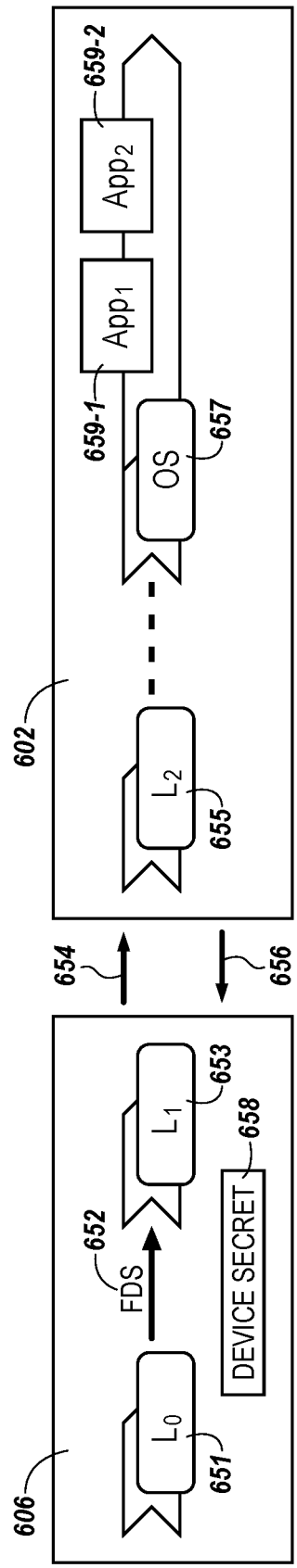
FIG. 6 is a block diagram of an example system including a host and a memory device in accordance with an embodiment of the present disclosure.

FIG. 6 is a block diagram of an example system including a memory device 606 and a host 602 in accordance with an embodiment of the present disclosure. Memory device 606 and host 602 can be, for example, host 302 and memory device 306, respectively, described in connection with FIG. 3.

A computing device can boot in stages using layers, with each layer authenticating and loading a subsequent layer and providing increasingly sophisticated runtime services at each layer. A layer can be served by a prior layer and serve a subsequent layer, thereby creating an interconnected web of the layers that builds upon lower layers and serves higher order layers. As is illustrated in FIG. 6, Layer 0 ("$L_0$") 651 and Layer 1 ("$L_1$") 653 are within the memory device 606. Layer 0 651 can provide a Firmware Derivative Secret (FDS) key 652 to Layer 1 653. The FDS key 652 can describe the identity of code of Layer 1 653 and other security relevant data. In an example, a particular protocol (such as robust internet of things (RIOT) core protocol) can use the FDS 652 to validate code of Layer 1 653 that it loads. In an example, the particular protocol can include a device identification composition engine (DICE) and/or the RIOT core protocol. As an example, an FDS can include Layer 1 firmware image itself, a manifest that cryptographically identifies authorized Layer 1 firmware, a firmware version number of signed firmware in the context of a secure boot implementation, and/or security-critical configuration settings for the device. A device secret 658 can be used to create the FDS 652 and be stored in memory associated with the memory device 606.

The memory device can transmit data, as illustrated by arrow 654, to the host 602. The transmitted data can include an external identification that is public, a certificate (e.g., an external identification certificate), and/or an external public key. Layer 2 ("$L_2$") 655 of the host 602 can receive the transmitted data, and execute the data in operations of the operating system ("OS") 657 and on a first application 659-1 and a second application 659-2.

In an example operation, the memory device 606 can read the device secret 658, hash an identity of Layer 1 653, and perform a calculation including:

$$K_{L1}=KDF[Fs(s),\text{Hash}(\text{"immutable information"})]$$

where $K_{L1}$ is an external public key, KDF (e.g., KDF defined in the National Institute of Standards and Technology (NIST) Special Publication 800-108) is a key derivation function (e.g., HMAC-SHA256), and Fs(s) is the device secret 658. FDS 652 can be determined by performing:

$$FDS=HMAC-SHA256[Fs(s),SHA256(\text{"immutable information"})]$$

Likewise, the host 602 can transmit data, as illustrated by arrow 656, to the memory device 606.

Figure 7:
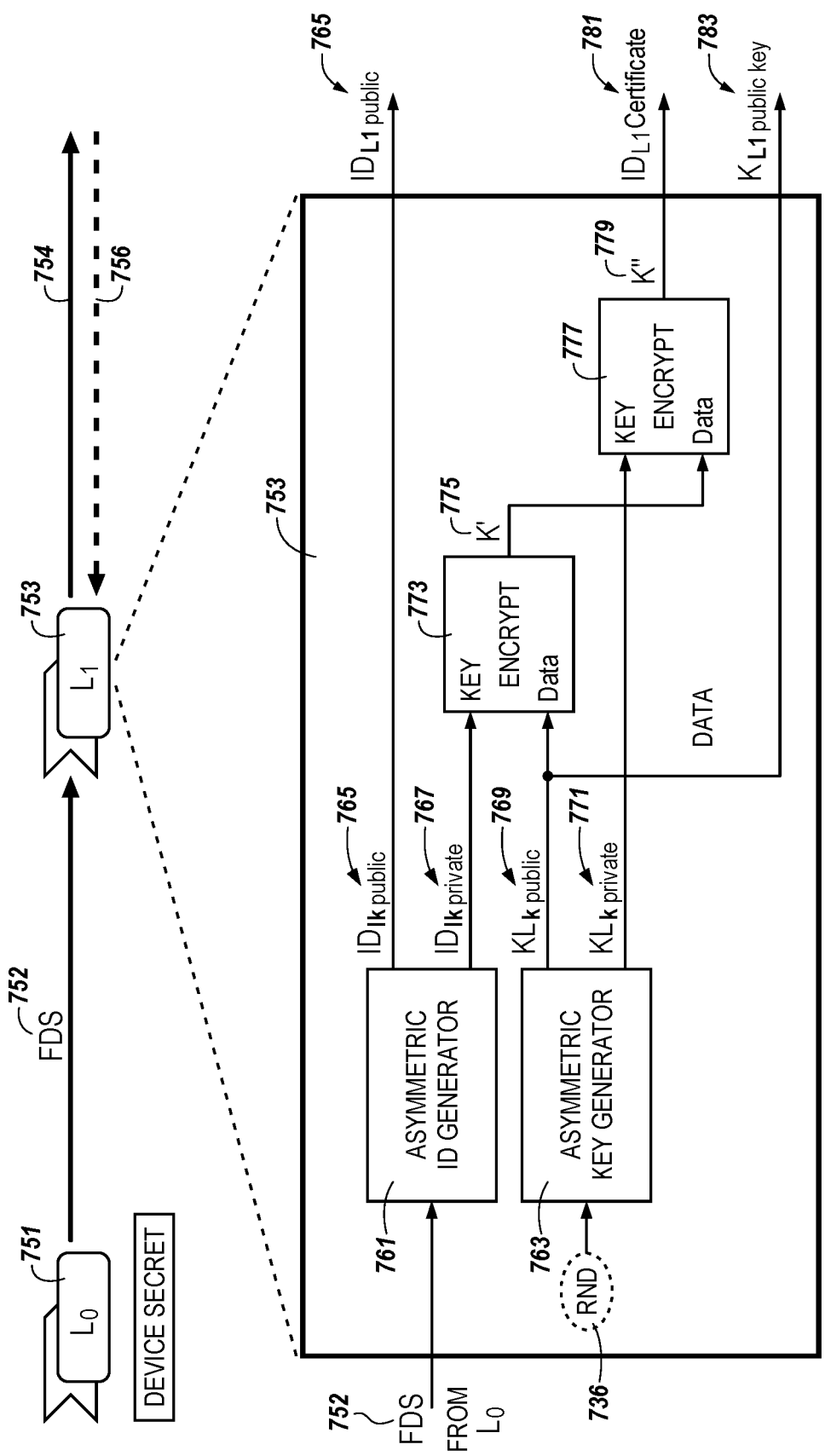
FIG. 7 is a block diagram of an example process to determine a number of parameters in accordance with an embodiment of the present disclosure.

FIG. 7 is a block diagram of an example process to determine a number of parameters in accordance with an embodiment of the present disclosure. FIG. 7 is an example of a determination of the parameters including the external public identification, the external certificate, and the external public key that are then sent, indicated by arrow 754, to Layer 2 (e.g., Layer 2 655) of a host device (e.g., 602 in FIG. 6). Layer 0 ("$L_0$") 751 in FIG. 7 corresponds to Layer 0 651 in FIG. 6 and likewise FDS 752 corresponds to FDS 652, Layer 1 753 corresponds to Layer 1 653, and arrows 754 and 756 correspond to arrows 654 and 656, respectively.

The FDS 752 from Layer 0 751 is sent to Layer 1 753 and used by an asymmetric ID generator 761 to generate a public identification ("$ID_{lk\ public}$") 765 and a private identification 767. In the abbreviated "$ID_{lk\ public}$," the "lk" indicates Layer k (in this example Layer 1), and the "public" indicates that the identification is openly shared. The public identification 765 is illustrated as shared by the arrow extending to the right and outside of Layer 1 753 of the memory device. The generated private identification 767 is used as a key input into an encryptor 773. The encryptor 773 can be any processor, computing device, etc. used to encrypt data.

Layer 1 753 of a memory device can include an asymmetric key generator 763. In at least one example, a random number generator (RND) 736 can optionally input a random number into the asymmetric key generator 763. The asymmetric key generator 763 can generate a public key ("$K_{Lk\ public}$") 769 (referred to as an external public key) and a private key ("$K_{LK\ private}$") 771 (referred to as an external private key) associated with a memory device such as memory device 606 in FIG. 6. The external public key 769 can be an input (as "data") into the encryptor 773. The encryptor 773 can generate a result K'775 using the inputs of the external private identification 767 and the external public key 769. The external private key 771 and the result K'775 can be input into an additional encryptor 777, resulting in output K" 779. The output K" 779 is the external certificate ("$ID_{L1}$ certificate") 781 transmitted to the Layer 2 (655 of FIG. 6). The external certificate 781 can provide an ability to verify and/or authenticate an origin of data sent from a device. As an example, data sent from the memory device can be associated with an identity of the memory device by verifying the certificate, as will be described further in association with FIG. 9. Further, the external public key ("$K_{L1\ public\ key}$") 783 can be transmitted to Layer 2. Therefore, the public identification 765, the certificate 781, and the external public key 783 of a memory device can be transmitted to Layer 2 of a host device.

Figure 8:
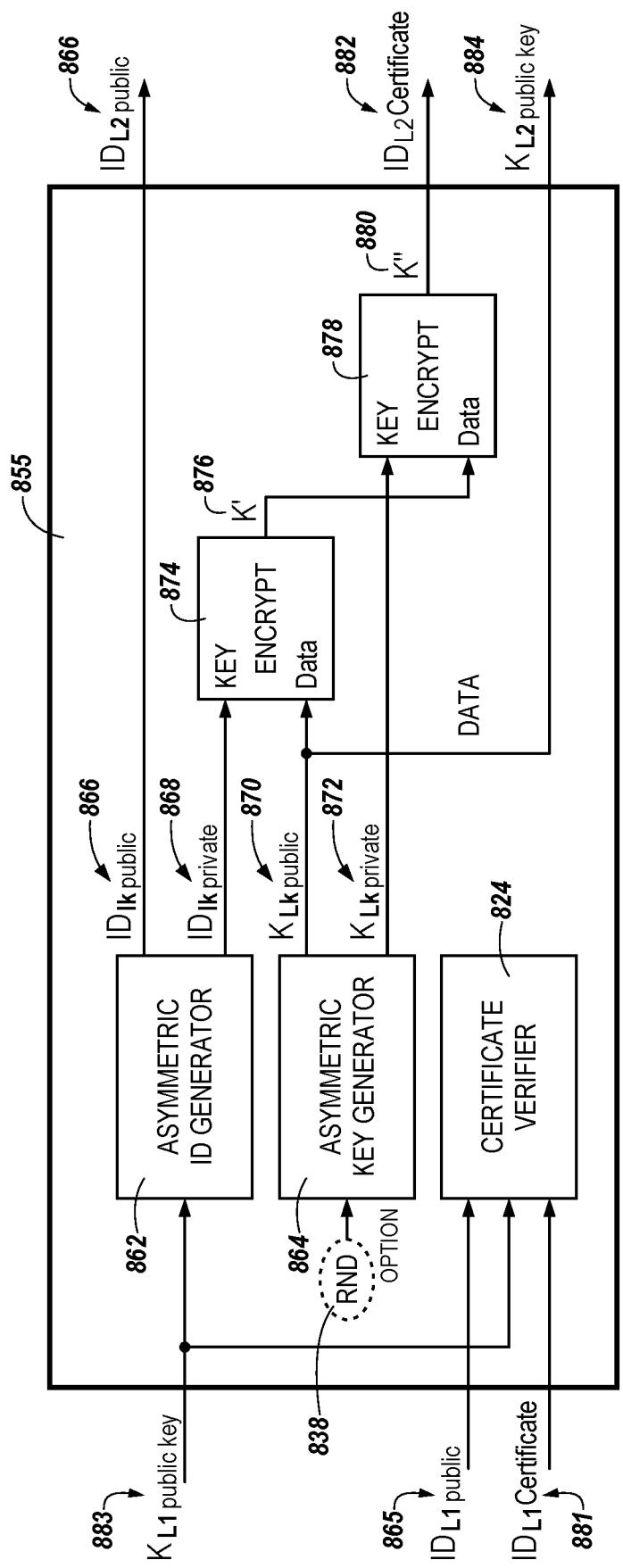
FIG. 8 is a block diagram of an example process to determine a number of parameters in accordance with an embodiment of the present disclosure.

FIG. 8 is a block diagram of an example process to determine a number of parameters in accordance with an embodiment of the present disclosure. FIG. 8 illustrates a Layer 2 855 of a host (e.g., host 602 in FIG. 6) generating a device identification ("ID$_{L2}$ public") 866, a device certificate ("ID$_{L2}$ Certificate") 882, and a device public key ("K$_{L2\ public\ key}$") 884.

The external public key ("K$_{L1\ public\ key}$") 883 transmitted from Layer 1 of the memory device to Layer 2 855 of a host, as described in FIG. 7, is used by an asymmetric ID generator 862 of the host to generate a public identification ("ID$_{lk\ public}$") 866 and a private identification 868 of the host. In the abbreviated "ID$_{lk\ public}$," the "lk" indicates Layer k (in this example Layer 2), and the "public" indicates that the identification is openly shared. The public identification 866 is illustrated as shared by the arrow extending to the right and outside Layer 2 855. The generated private identification 868 is used as a key input into an encryptor 874.

As shown in FIG. 8, the external certificate 881 and external identification 865, along with the external public key 883, are used by a certificate verifier 824. The certificate verifier 824 can verify the external certificate 881 received from a memory device (e.g., memory device 606), and determine, in response to the external certificate 881 being verified or not being verified, whether to accept or discard data received from the memory device. Further details of verifying the external certificate 881 is described in connection with FIG. 9.

Layer 2 855 of the host can include an asymmetric key generator 864. In at least one example, a random number generator (RND) 838 can optionally input a random number into the asymmetric key generator 864. The asymmetric key generator 864 can generate a public key ("K$_{Lk\ public}$") 870 (referred to as a device public key) and a private key ("K$_{LK\ private}$") 872 (referred to as a device private key) associated with a host device such as host 602 in FIG. 6. The device public key 870 can be an input (as "data") into the encryptor 874. The encryptor 874 can generate a result K' 876 using the inputs of the device private identification 868 and the device public key 870. The device private key 872 and the result K' 876 can be input into an additional encryptor 878, resulting in output K" 880. The output K" 880 is the device certificate ("ID$_{L2}$ certificate") 882 transmitted back to the Layer 1 (653 of FIG. 6). The device certificate 882 can provide an ability to verify and/or authenticate an origin of data sent from a device. As an example, data sent from the host can be associated with an identity of the host by verifying the certificate, as will be described further in association with FIG. 9. Further, the device public key ("K$_{L2\ public\ key}$") 884 can be transmitted to Layer 1. Therefore, the public identification 866, the certificate 882, and the device public key 884 of the host can be transmitted to Layer 1 of a memory device.

In an example, in response to a memory device receiving a public key from a host, the memory device can encrypt data to be sent to the host using the device public key. Vice versa, the host can encrypt data to be sent to the memory device using the external public key. In response to the host receiving data encrypted using the device public key, the host can decrypt the data using its own device private key. Likewise, in response to the memory device receiving data encrypted using the external public key, the memory device can decrypt the data using its own external private key. As the device private key is not shared with another device outside the host and the external private key is not shared with another device outside the memory device, the data sent to the host and the memory device remains secure.

Figure 9:
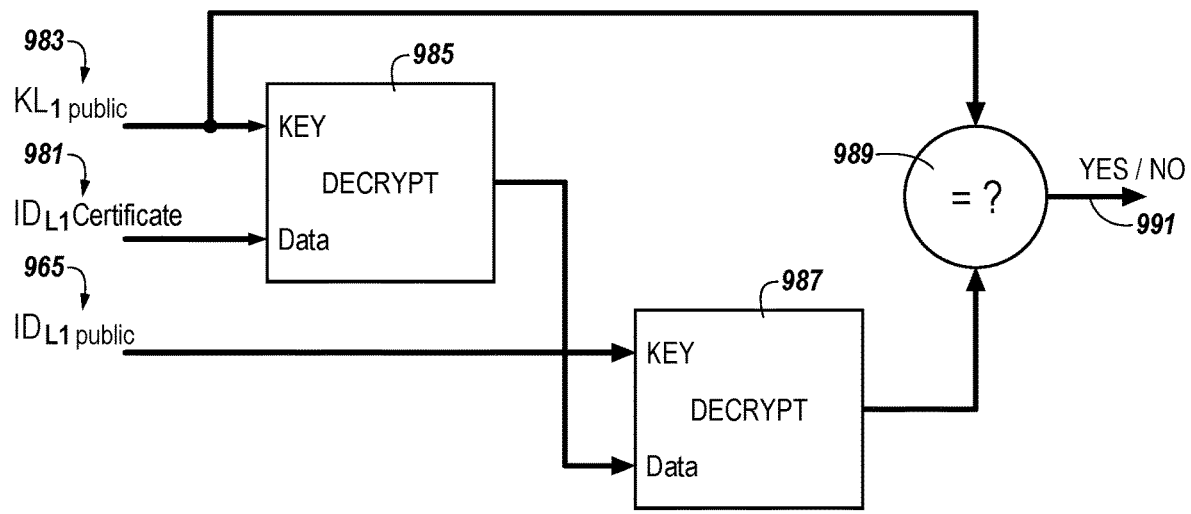
FIG. 9 is a block diagram of an example process to verify a certificate in accordance with an embodiment of the present disclosure.

FIG. 9 is a block diagram of an example process to verify a certificate in accordance with an embodiment of the present disclosure. In the illustrated example of FIG. 9, a public key 983, a certificate 981, and a public identification 965 is provided from a memory device (e.g., from Layer 1 653 of memory device 606 in FIG. 6). The data of the certificate 981 and the external public key 983 can be used as inputs into a decryptor 985. The decryptor 985 can be any processor, computing device, etc used to decrypt data. The result of the decryption of the certificate 981 and the external public key 983 can be used as an input into a secondary decryptor 987 along with the public identification, result in an output. The external public key 983 and the output from the decryptor 987 can indicate, as illustrated at 989, whether the certificate is verified by a comparison, resulting in a yes or no 991 as an output. In response to the certificate being verified, data received from the device being verified can be accepted, decrypted, and processed. In response to the certificate not being verified, data received from the device being verified can be discarded, removed, and/or ignored. In this way, nefarious devices sending nefarious data can be detected and avoided. As an example, a hacker sending data to be processed can be identified and the hacking data not processed.

Figure 10:
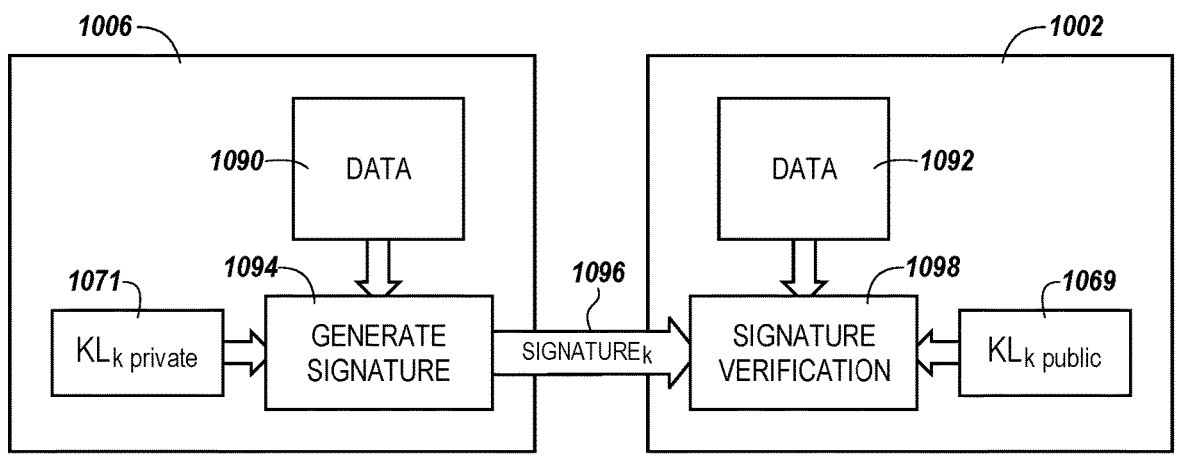
FIG. 10 is a block diagram of an example process to verify a signature in accordance with an embodiment of the present disclosure.

FIG. 10 is a block diagram of an example process to verify a signature in accordance with an embodiment of the present disclosure. In the instance where a device is sending data that may be verified in order to avoid subsequent repudiation, a signature can be generated and sent with data. As an example, a first device may make a request of a second device and once the second device performs the request, the first device may indicate that the first device never made such a request. An anti-repudiation approach, such as using a signature, can avoid repudiation by the first device and insure that the second device can perform the requested task without subsequent difficulty.

A memory device 1006 (such as memory device 306 in FIG. 3) can send data 1090 to a host (such as host 302 in FIG. 3). The memory device 1006 can generate, at 1094, a signature 1096 using a device private key 1071. The signature 1096 can be transmitted to the host 1002. The host 1002 can verify, at 1098, the signature using data 1092 and the external public key 1069 previously received. In this way, the signature is generated using a private key and verified using a public key. In this way, the private key used to generate a unique signature can remain private to the device sending the signature while allowing the receiving device to be able to decrypt the signature using the public key of the sending device for verification. This is in contrast to encryption/decryption of the data, which is encrypted by the sending device using the public key of the receiving device and decrypted by the receiving device using the private key of the receiver. In at least one example, the device can verify the digital signature by using an internal cryptography process (e.g., Elliptical Curve Digital signature (ECDSA) or a similar process.

Figure 11:
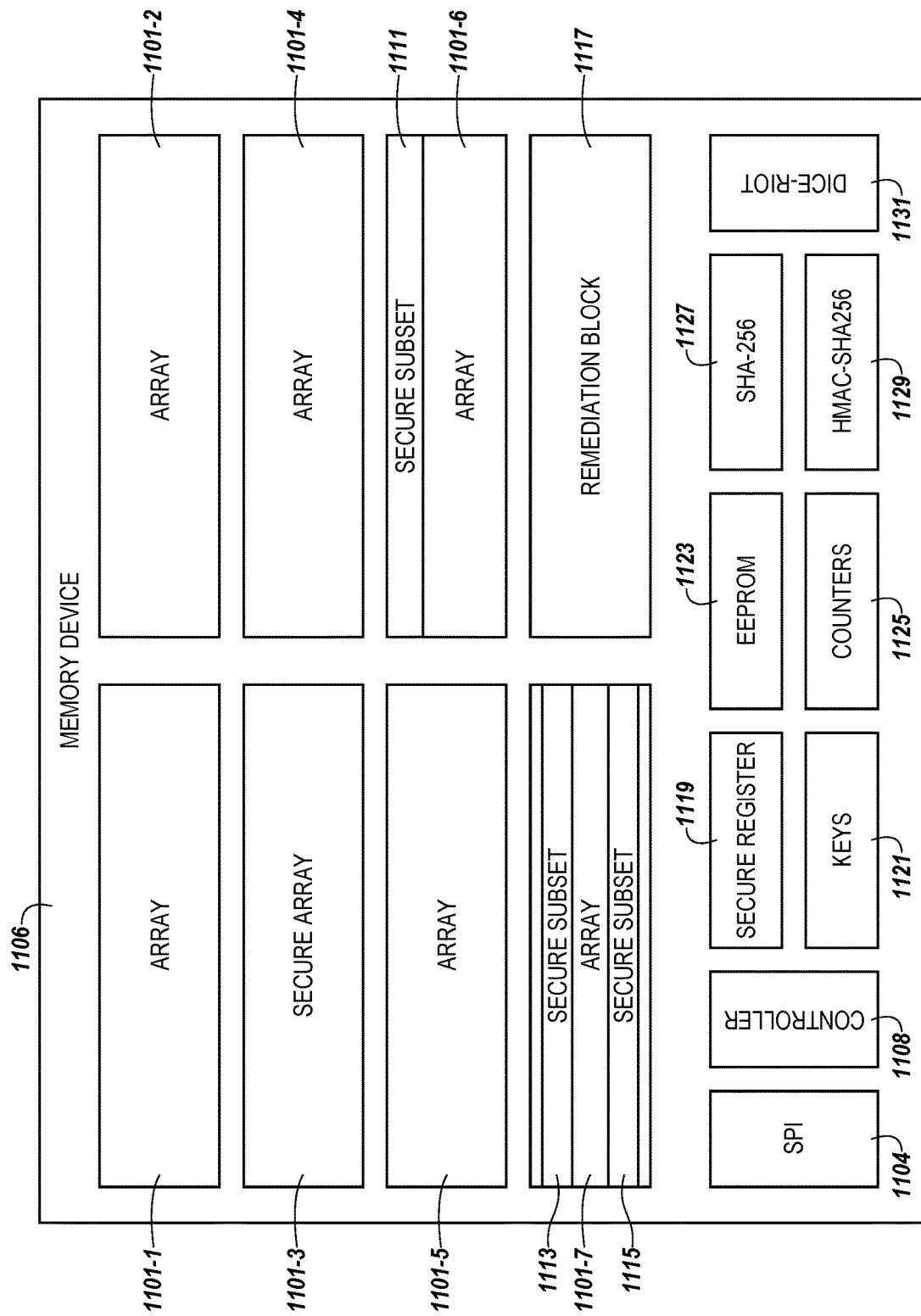
FIG. 11 is a block diagram of an example memory device in accordance with an embodiment of the present disclosure.

FIG. 11 is a block diagram of an example memory device 1106 in accordance with an embodiment of the present disclosure. Memory device 1106 can be, for example, memory device 306 previously described in connection with FIG. 3.

As shown in FIG. 11, memory device 1106 can include a number of memory arrays 1101-1 through 1101-7. Memory arrays 1101-1 through 1101-7 can be analogous to memory array 101 previously described in connection with FIG. 1. Further, in the example illustrated in FIG. 11, memory array 1101-3 is a secure array, subset 1111 of memory array 1101-6 comprises a secure array, and subsets 1113 and 1115 of memory array 1101-7 comprise a secure array. Subsets 1111, 1113, and 1115 can each include, for instance, 4 kilobytes of data. However, embodiments of the present disclosure are not limited to a particular number or arrangement of memory arrays or secure arrays.

As shown in FIG. 11, memory device 1106 can include a remediation (e.g., recovery) block 1117. Remediation block 1117 can be used as a source of data in case of errors (e.g., mismatches) that may occur during operation of memory device 1106. Remediation block 1117 may be outside of the area of memory device 1106 that is addressable by a host.

As shown in FIG. 11, memory device 1106 can include a serial peripheral interface (SPI) 1104 and a controller 1108. Memory device 1106 can use SPI 1104 and controller 1108 to communicate with a host and memory arrays 1101-1 through 1101-7, as previously described herein (e.g., in connection with FIG. 3).

As shown in FIG. 11, memory device 1106 can include a secure register 1119 for managing the security of memory device 1106. For example, secure register 1119 can configure, and communicate externally, to an application controller. Further, secure register 1119 may be modifiable by an authentication command.

As shown in FIG. 11, memory device 1106 can include keys 1121. For instance, memory device 1106 can include eight different slots to store keys such as root keys, DICE-RIOT keys, and/or other external session keys.

As shown in FIG. 11, memory device 1106 can include an electronically erasable programmable read-only memory (EEPROM) 1123. EEPROM 1123 can provide a secure non-volatile area available for a host, in which individual bytes of data can be erased and programmed.

As shown in FIG. 11, memory device 1106 can include counters (e.g., monotonic counters) 1125. Counters 1125 can be used as an anti-replay mechanism (e.g., freshness generator) for commands (e.g., to sign a command set or sequence) received from and/or sent to a host. For instance, memory device 1106 can include six different monotonic counters, two of which may be used by memory device 1106 for the authenticated commands, and four of which may be used by the host.

As shown in FIG. 11, memory device 1106 can include an SHA-256 cryptographic hash function 1127, and/or an HMAC-SHA256 cryptographic hash function 1129. SHA-256 and/or HMAC-SHA256 cryptographic hash functions 1127 and 1129 can be used by memory device 1106 to generate cryptographic hashes, such as, for instance, the cryptographic hashes of the update 220 previously described herein in connection with FIG. 3, and/or a golden hash used to validate the data stored in memory arrays 1101-1 through 1101-7 as previously described herein. Further, memory device 1106 can support L0 and L1 of DICE-RIOT 1131.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
    a memory; and
    circuitry associated with the memory, the circuitry configured to:
        read data stored in a secure array of the memory;
        identify a different memory having an error correcting code (ECC) corresponding to the read data of the memory;
        execute an integrity check to compare the ECC to the read data of the memory; and
        take an action in response to the comparison of the read data of the memory and the ECC, wherein:
            the comparison indicates that the ECC identified an error in the read data of the memory; and
            wherein the memory refrains from applying a correction to the read data of the memory, based on the error identified by the ECC of the different memory.

2. The apparatus of claim 1, wherein the ECC is read by the different memory in parallel to the read data of the memory.

3. The apparatus of claim 1, wherein the action taken is to refrain from correcting the error in the read data of the memory in response to the error identified by the ECC.

4. The apparatus of claim 1, wherein the ECC of the different memory and the read data of the memory are associated with a powertrain operation of a host device associated with the memory and the different memory.

5. The apparatus of claim 4, wherein the circuitry is further configured to:
    generate an alert in response to the indication that the ECC identified the error in the read data of the memory; and
    transmit the alert to the host device associated with the memory and the different memory.

6. An apparatus, comprising:
    a memory; and
    circuitry associated with the memory, the circuitry configured to:
        read error correcting code (ECC) stored in a secure array of the memory;
        identify a different memory having read data corresponding to the ECC of the memory, wherein the read data of the different memory and the ECC of the memory are read at a start-up of the memory and the different memory;
        execute an integrity check to compare the ECC to the read data of the different memory; and
        take an action in response to the comparison of the read data of the different memory and the ECC of the memory, wherein the comparison indicates that the ECC identified an error in the read data of the different memory.

7. The apparatus of claim 6, wherein the memory includes the ECC to monitor error introduced to the read data of the different memory when the data is read by the different memory.

8. A system, comprising:
a controller;
a first memory device in communication with the controller;
a second memory device in communication with the controller, the controller configured to:
receive read data from the first memory device;
receive an error correcting code (ECC) corresponding to the read data of the first memory device;
execute an integrity check by comparing the read data of the first memory device and the ECC provided by the second memory device, wherein comparing the read data of the first memory device to the ECC provided by the second memory device includes comparing a hash function corresponding to the data and a digest corresponding to the ECC; and
take an action in response to the comparison of the read data of the first memory device and the ECC, wherein the comparison indicates that the ECC identified an error in the read data of the first memory device.

9. The system of claim 8, wherein the controller is associated with a vehicle.

10. The system of 9, wherein the read data of the first memory device is data associated with a powertrain operation of the vehicle.

11. The system of claim 9, wherein operations of the vehicle are halted in response to the error identified by the ECC.

12. The system of claim 8, wherein the error identified in the read data of the first memory device is corrected by the controller.

13. A method, comprising:
receiving read data of a first memory device, wherein receiving the read data of the first memory device includes receiving instructions to execute a routine to operate a powertrain of a host vehicle;
receiving an error correcting code (ECC) from a second memory device, wherein the ECC corresponds to the read data of the first memory device;
comparing the ECC from the second memory device to the read data of the first memory device to determine error detected by the ECC;
determining an integrity of the read data of the first memory based on the comparison of the ECC to the read data of the first memory; and
taking an action in response to the determined integrity of the read data of the first memory.

14. The method of claim 13, wherein taking an action further comprises:
generating, by the first memory device, an alert indicating an error in the read data of the first memory device and identified by the integrity check; and
transmitting to a controller in communication with the first memory device, the alert indicating the error identified.

15. The method of claim 13, wherein taking an action further comprises:
receiving, by a controller included in the vehicle, an alert in response to an error identified by the determined integrity; and
aborting, by the controller, the powertrain operations of the host vehicle.

16. An apparatus, comprising:
a memory; and
circuitry associated with the memory, the circuitry configured to:
read data stored in a secure array of the memory;
identify a different memory having an error correcting code (ECC) corresponding to the read data of the memory;
execute an integrity check to compare the ECC to the read data of the memory;
take an action in response to the comparison of the read data of the memory and the ECC, wherein the comparison indicates that the ECC identified an error in the read data of the memory; and
determine that a correction applied to the error identified by the ECC introduced an additional error to the ECC.

17. An apparatus, comprising:
a memory; and
circuitry associated with the memory, the circuitry configured to:
read data stored in a secure array of the memory;
identify a different memory having an error correcting code (ECC) corresponding to the read data of the memory;
execute an integrity check to compare the ECC to the read data of the memory, wherein the integrity check is executed by the memory in response to a start-up process of the memory; and
take an action in response to the comparison of the read data of the memory and the ECC, wherein the comparison indicates that the ECC identified an error in the read data of the memory.

18. An apparatus, comprising:
a memory; and
circuitry associated with the memory, the circuitry configured to:
read data stored in a secure array of the memory;
identify a different memory having an error correcting code (ECC) corresponding to the read data of the memory
execute an integrity check to compare the ECC to the read data of the memory;
take an action in response to the comparison of the read data of the memory and the ECC, wherein the comparison indicates that the ECC identified an error in the read data of the memory; and
determine whether the error identified by the ECC affects an operation of a host device associated with the read data of the memory.

19. An apparatus, comprising:
a memory; and
circuitry associated with the memory, the circuitry configured to:
read error correcting code (ECC) stored in a secure array of the memory;
identify a different memory having read data corresponding to the ECC of the memory, wherein:
the memory and the different memory are associated with a host; and
the read data is written to the different memory and the ECC is written to the memory when the host is manufactured;
execute an integrity check to compare the ECC to the read data of the different memory; and
take an action in response to the comparison of the read data of the different memory and the ECC of the memory, wherein the comparison indicates that the ECC identified an error in the read data of the different memory.

* * * * *